United States Patent [19]

Bigowsky et al.

[11] Patent Number: 4,733,740
[45] Date of Patent: Mar. 29, 1988

[54] AUTOMATED GUIDED VEHICLE SYSTEM

[75] Inventors: Michael F. Bigowsky, Girard; James P. Freed, Uniontown, both of Ohio

[73] Assignee: Custom Technologies, Inc., Beloit, Ohio

[21] Appl. No.: 860,106

[22] Filed: May 6, 1986

[51] Int. Cl.⁴ .............................................. B62D 1/26
[52] U.S. Cl. ..................................... 180/168; 104/295; 104/304
[58] Field of Search .................. 180/168, 167; 104/96, 104/88, 170, 171, 244.1, 287, 288, 295, 304; 364/424

[56] References Cited

U.S. PATENT DOCUMENTS

| | | | |
|---|---|---|---|
| 2,742,099 | 4/1956 | Hagen | 180/79.1 |
| 3,009,525 | 11/1961 | DeLiban | 180/82 |
| 3,705,387 | 12/1972 | Stern et al. | 340/171 A |
| 3,738,443 | 6/1973 | Kubo | 180/98 |
| 4,042,058 | 8/1977 | Cooper | 180/98 |
| 4,108,269 | 8/1978 | Nakao | 180/98 |
| 4,333,147 | 6/1982 | Regueiro et al. | 364/436 |
| 4,607,575 | 8/1986 | Bryda | 104/30 |

FOREIGN PATENT DOCUMENTS 0179434  4/1986 European Pat. Off. ............ 180/168

Primary Examiner—John J. Love
Assistant Examiner—Richard Camby
Attorney, Agent, or Firm—Renner, Kenner, Greive, Bobak & Taylor

[57] ABSTRACT

A system to determine the instantaneous position of a vehicle (11) which is attached to a track (12) by a mast arm (13) includes sensors (17, 19) to determine the location of the point (A) at which the arm (13) is attached to the track (12). An additional sensor (32) provides a signal to a circuit (47) which also receives signals from sensors (17, 19) and then locates the lateral and longitudinal position of the vehicle (11) with respect to point (A). Once the instantaneous position of the vehicle (11) has been established, a signal representative thereof is compared with a reference signal and the vehicle is controlled accordingly.

12 Claims, 5 Drawing Figures

AUTOMATED GUIDED VEHICLE SYSTEM

TECHNICAL FIELD

This invention relates to a robot-like vehicle which can transfer and handle heavy loads, usually in a factory environment. More specifically, this invention relates to a system whereby such an unmanned vehicle can be guided along a predetermined path in the factory or other environment.

BACKGROUND ART

More and more frequently, modern industrial facilities are utilizing unmanned vehicles to transport and handle material as opposed to overhead cranes, fork lift trucks and the like. The use of such vehicles substantially reduces the required factory manpower thereby substantially reducing factory costs. Typically, these vehicles, often called automated guided vehicles, are powered by on-board lead-acid or nickel-cadmium storage type batteries and follow a path around the facility usually defined by a wire embedded in the floor in a predetermined fixed pattern or optical tape affixed to the floor in a predetermined fixed pattern. These vehicles usually communicate with a central control through atmospheric radio frequency transmissions.

These types of vehicles are, however, not without their problems. Of prime concern is the inability of the user to readily alter the path of the vehicle because the wire imbedded in the floor is a rather permanent fixture. If a change in path is desired, it is necessary to shut down the facility and physically relocate the wire in the floor.

Another aggravation to the user of the typical vehicles is that some factory environments interfere with the radio signals to the vehicle. This can occur even where only short transmission distances are involved and can be solved, if at all, only with sophisticated and expensive transmission systems.

Finally, the use of battery power has its deficiencies. Not only do batteries provide a limited quantity of power, but they also need frequent recharging resulting in equipment downtime. Such recharging is not only time-consuming but it could often be hazardous with many expensive precautions having to be taken to avoid injury due to, for example, exposure to a caustic chemical. Furthermore, the mere existence of the batteries themselves on the vehicle consumes valuable vehicle space and utilizes some of the weight capacity of the vehicle.

In short, the prior art automated guided vehicles, of which we are aware, do not provide the total answer for an efficient, versatile unmanned material handling vehicle.

DISCLOSURE OF THE INVENTION

It is thus a primary object of the present invention to provide an automated guided vehicle system which is not a slave to a predetermined path fixed in a floor.

It is another object of the present invention to provide an automated guided vehicle system, as above, with a path control feature which readily permits the changing of the path of the vehicle.

It is a further object of the present invention to provide an automated guided vehicle system, as above, which permits the vehicle to know its current position in space and transmit that information to a control system.

It is an additional object of the present invention to provide an automated guided vehicle system, as above, with either on-board or remote guidance control.

It is still another object of the present invention to provide an automated guided vehicle system, as above, in which there is no need or requirement for atmospheric transmissions.

It is yet another object of the present invention to provide an automated guided vehicle system, as above, in which downtime is avoided and space and weight saved by the elimination of the battery power.

It is a still further object of the present invention to provide an automated guided vehicle system, as above, which utilizes the more consistent, stronger and reliable utility power rather than battery power.

It is additionally an object of the present invention to provide an automated guided vehicle system, as above, which advantageously consolidates the power supply, communications link and guidance control system all in one package.

These and other objects of the present invention, which will become apparent from the description to follow, are accomplished by the improvements hereinafter described and claimed.

In general, a system for determining the location of a vehicle movable along the ground includes a track system having an arm attached thereto and movable longitudinally therealong. The other end of the arm is attached to the vehicle. Means are provided to determine the longitudinal position of the end of the arm along the track. Finally, means are provided to determine the lateral and longitudinal position of the vehicle with respect to the end of the arm which is connected to the track thereby longitudinally and laterally locating the vehicle.

Once the actual position of the vehicle has been determined, an electronic signal representative thereof may be sent to a comparator circuit which also receives reference signals representative of the desired location of the vehicle. The comparator circuit then detects differences between the two signals and provides a command signal to the vehicle so that the vehicle will move, if necessary, from its actual position to the desired position.

PREFERRED EMBODIMENT FOR CARRYING OUT THE INVENTION

Figure 1:
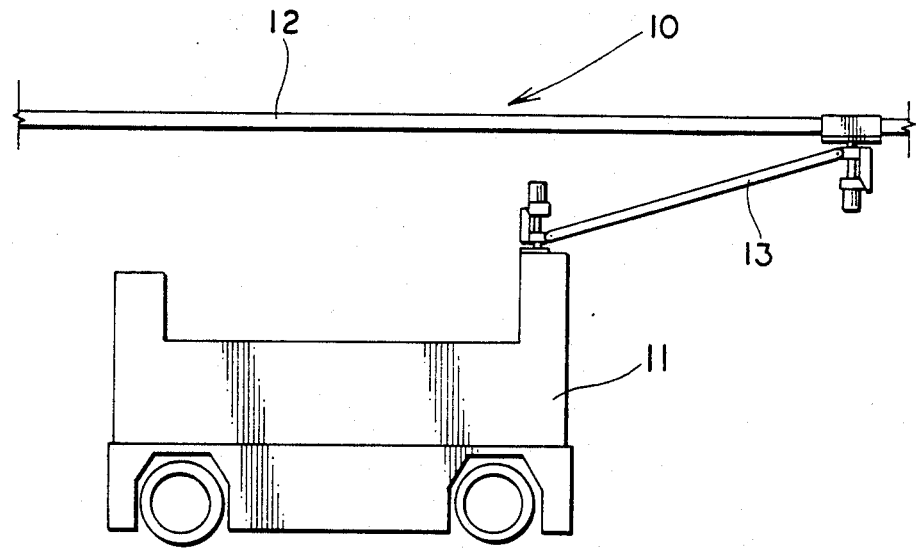
FIG. 1 is a schematic elevational view of an automated guided vehicle system according to the concept of the present invention showing a vehicle connected to an overhead track via a mast arm.
Figure 2:
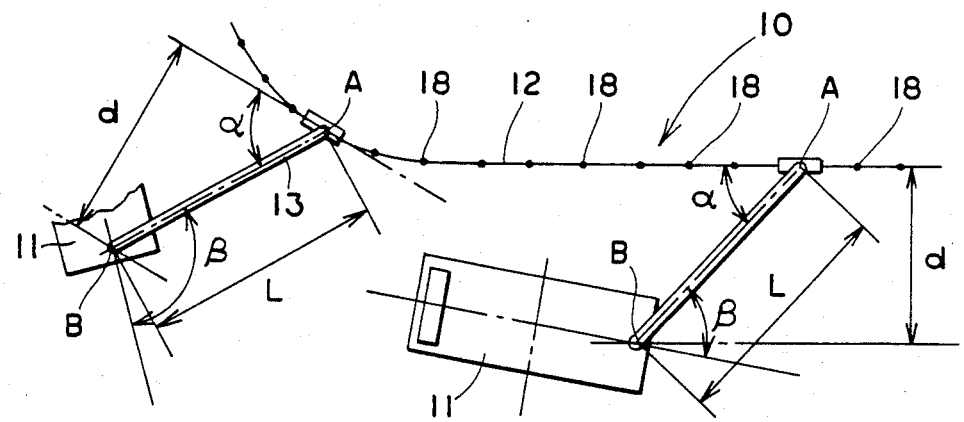
FIG. 2 is a schematic plan view thereof.

An automated guided vehicle system is indicated generally by the numeral 10 in the drawings and includes, as schematically shown in FIGS. 1 and 2, a vehicle 11 connected to an overhead track system 12 by a mast arm 13. Vehicle 11 can be any type of conventional vehicle which rides on the floor of a factory or the like and which is capable of carrying desired loads. Vehicle 11 is capable of receiving command signals to automatically drive and steer the same in a conventional manner.

Overhead track system 12 can be a conventional rail system such as that sold by Allen Translift of Saginaw, Mich. Typically these track systems are provided with a plurality of conductors some of which are used to provide utility power to vehicle 11. This is conventionally accomplished by a sliding shoe assembly which travels along the power conductors and transfers the utility power along mast arm 13 to vehicle 11. Additionally, one or more of the conductors of track system 12 can be utilized to provide a communications link between a central control unit and vehicle 11.

One aspect of the present invention is the ability to determine the location of the vehicle at all times. The manner in which this is accomplished is best described with reference to FIG. 2. Mast arm 13 is pivotally connected to track system 12, in a manner to be hereinafter described, at point A and is likewise pivotally connected to vehicle 11, in a manner to be hereinafter described, at point B. By determining the longitudinal position of point A, in a manner also to hereinafter be described, the lateral and longitudinal position of point B with respect to point A, and thus the lateral and longitudinal position of vehicle 11, can also be determined.

In order to determine the instantaneous lateral distance d at which point B is from track 12, one first must know the length of mast arm 13. This information coupled with data relative to either the vertical distance between point B and track 12 or the angle between mast 13 and track 12 (as seen in FIG. 1) enables one to calculate the orthogonal projection length L of mast arm 13. Because the system of the present invention is able to determine, in a manner to be hereinafter described, angle $\alpha$, that is, the angle between the longitudinal centerlines of mast arm 13 and track 12 as viewed in plan (FIG. 2), distance d and the longitudinal position of point B can readily be mathematically determined using well known trigonometric equations. Thus, by knowing the longitudinal position of point A along track 12 and knowing angle $\alpha$, the precise position of point B can be determined.

In order to determine the angular orientation of vehicle 11 with respect to the longitudinal direction of track 12 and thus to determine the position of every point of vehicle 11, the present invention senses, in a manner to be hereinafter described, angle $\beta$, that is, the angle between the longitudinal centerlines of mast arm 13 and vehicle 11. The present invention thus determines the position of point B and the angular orientation of vehicle 11 at all times, even when track 12 curves, as is shown as the alternate position of vehicle 11 in FIG. 2. There, it should be noted, angle $\alpha$ is the angle between mast arm 13 and the tangent to track 12 at point A.

Figure 3:
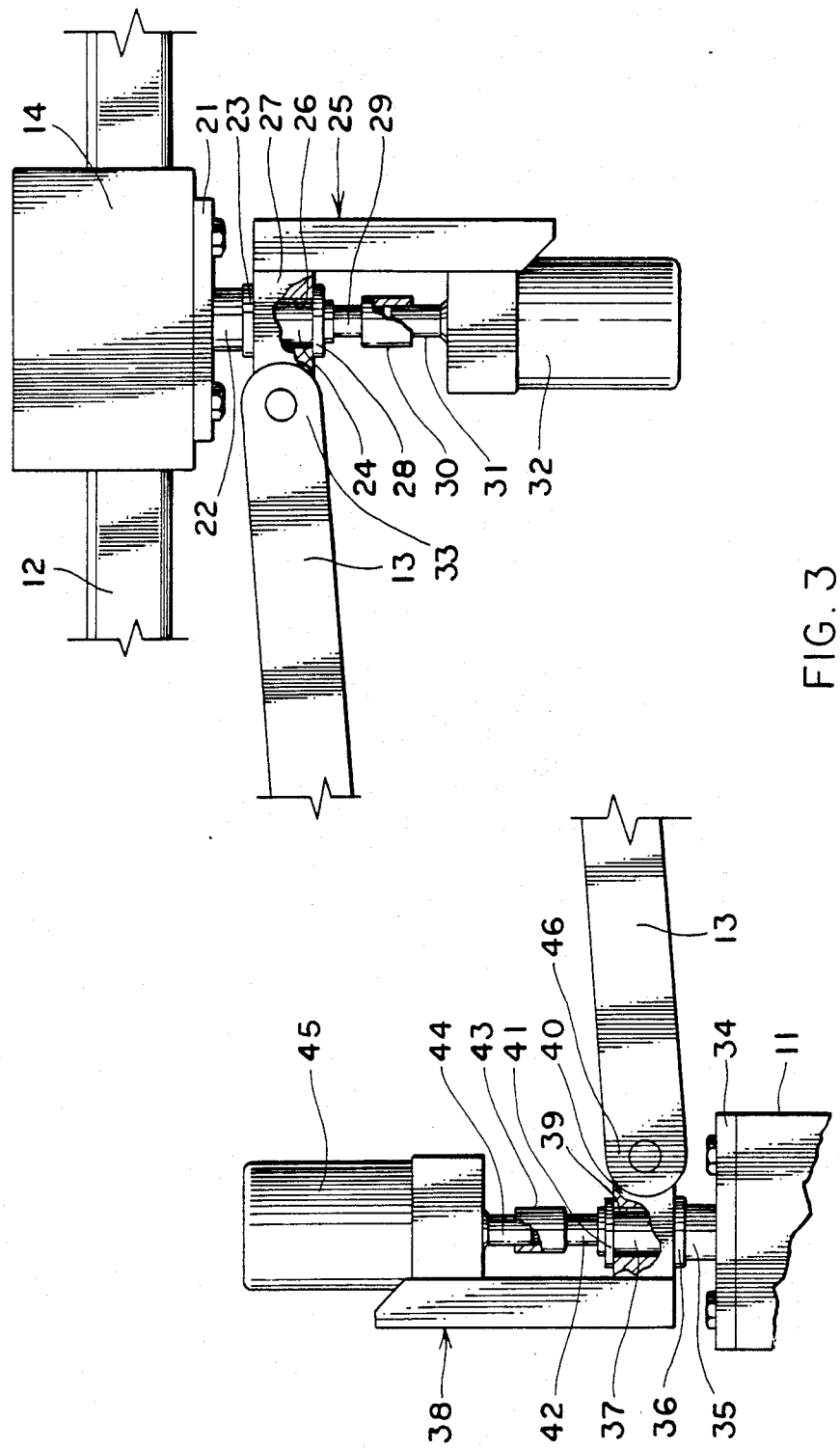
FIG. 3 is a somewhat schematic view showing the manner in which the mast arm, broken away, is connected to the track and to the vehicle.
Figure 4:
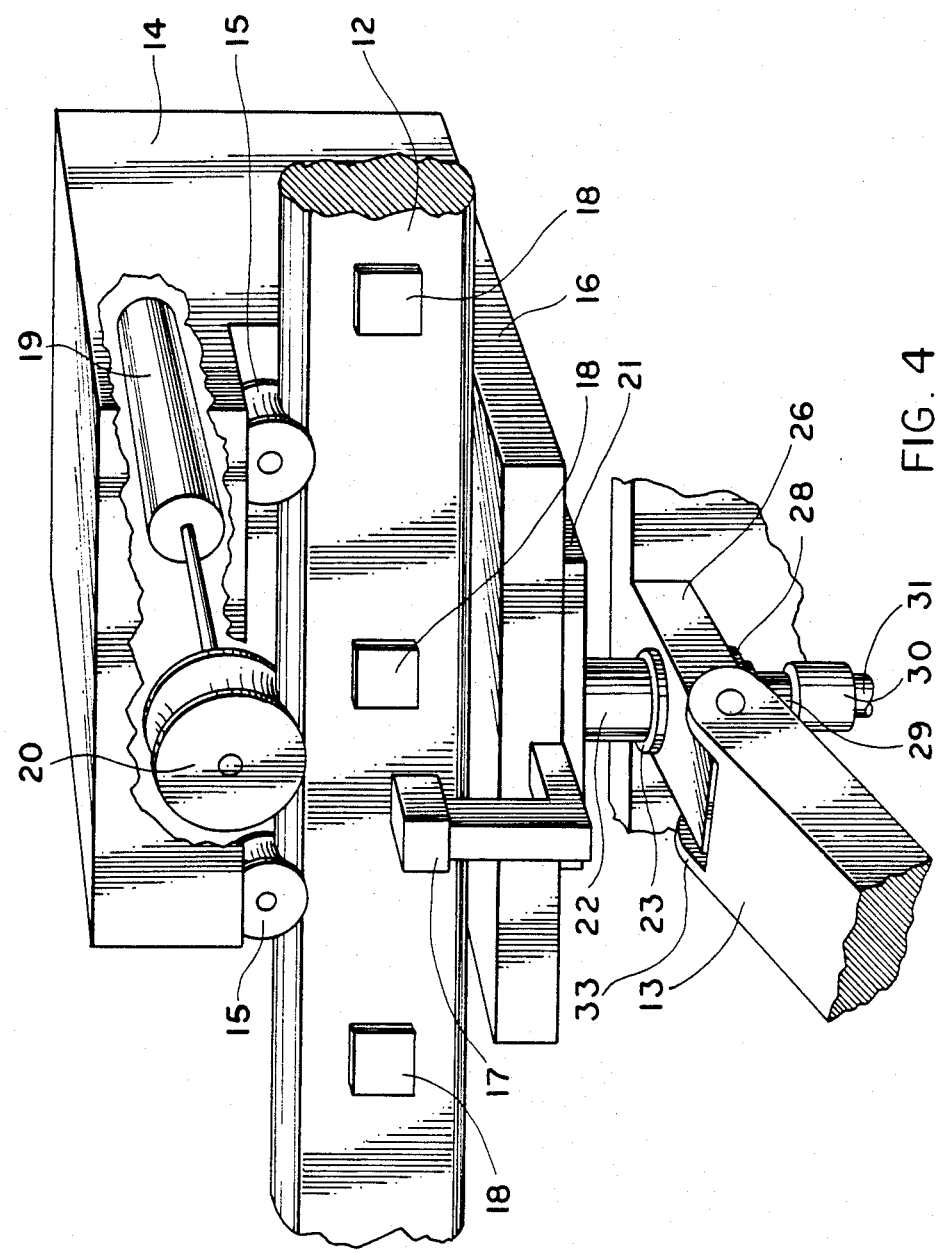
FIG. 4 is a somewhat schematic perspective view of the track and its members.

One manner in which the various positions and angles described above may be sensed will now be described in detail. As shown in FIGS. 3 and 4, track 12 is surrounded by a C-shaped trolley 14 which can be part of the rail system, such as supplied by Allen Translift previously described. Trolley 14 is provided with wheels 15 which ride on track 12. The lower branch 16 of trolley 14 carries a conventional sensor 17 which reads a plurality of discreet position identification tags 18 (FIGS. 2 and 4) mounted along track 12 at predetermined fixed locations which can be, but need not be, evenly spaced. As would be evident to one of ordinary skill in the art, tags 18 can be passive elements each being coded so that discreet identifications can be sensed or tags 18 could be active elements putting out discreet signals to be picked up by sensor 17.

In either event, sensor 17 is aware of the position of trolley 14, but only to the extent of its position with respect to identification tags 18. A finer or more graduated or calibrated position sensing is accomplished by a conventional encoder assembly 19 which is carried by trolley 14 and includes a wheel 20 riding on track 12. Encoder 19 counts the revolutions of wheel 20 to divide the distance between tags 18 into smaller detected units. Therefore, between sensor 17 and encoder 19, the precise longitudinal position of trolley 14 and thus point A of mast arm 13 can be determined.

As best shown in FIGS. 3 and 4, branch 16 of trolley 14 carries a mounting plate 21 which has a shaft 22 fixed thereto. A locating shoulder 23 extends around a reduced diameter shaft 24 affixed to shaft 22. An L-shaped transducer mounting bracket 25 is provided with an aperture 26 through branch 27 thereof into which shaft 24 is received so that bracket 25 is rotatable with respect to shaft 24. A retaining clip 28 positively positions branch 27 of bracket 25 against shoulder 23. Shaft 24 terminates at its lower end as a further reduced diameter shaft 29 which is attached, as by coupling 30, to a stub shaft 31 of a conventional transducer body 32. Bracket 25 carries transducer body 32 for rotation therewith about stub shaft 31. The distal end of branch 27 of bracket 25 is connected, as by a clevis arrangement 33, to mast arm 13.

As vehicle 11 moves laterally of track 12, mast arm 13 and bracket 25 are rotated a corresponding amount causing transducer body 32 to rotate about fixed stub shaft 31, the axis of which establishes point A. The transducer senses this angular movement and angle $\alpha$ is thereby determined in a manner well known to one of ordinary skill in the art.

The mounting of the lower end of mast arm 13 to vehicle 11 is essentially identical to the mounting of the upper end of mast arm 13 to trolley 14. As shown in FIG. 3, vehicle 11 carries a mounting plate 34 which has a shaft 35 fixed thereto. A locating shoulder 36 extends around a reduced diameter shaft 37 affixed to shaft 35. An L-shaped transducer mounting bracket 38 is provided with an aperture 39 through branch 40 thereof into which shaft 37 is received so that bracket 38 is rotatable with respect to shaft 37. A retaining clip 41 positively positions branch 40 of bracket 38 against shoulder 36. Shaft 37 terminates at its lower end as a further reduced diameter shaft 42 which is attached, as by coupling 43, to a stub shaft 44 of a conventional transducer body 45. Bracket 38 carries transducer body 45 for rotation therewith about stub shaft 44. The distal end of branch 40 of bracket 38 is connected, as by a clevis arrangement 46, to mast arm 13.

As vehicle 11 is steered about point B, bracket 38 is rotated a corresponding amount causing transducer body 45 to rotate about fixed stub shaft 44, the axis of which establishes point B. The transducer senses this angular movement and angle $\beta$ is thereby determined in a manner well known to one of ordinary skill in the art.

Figure 5:
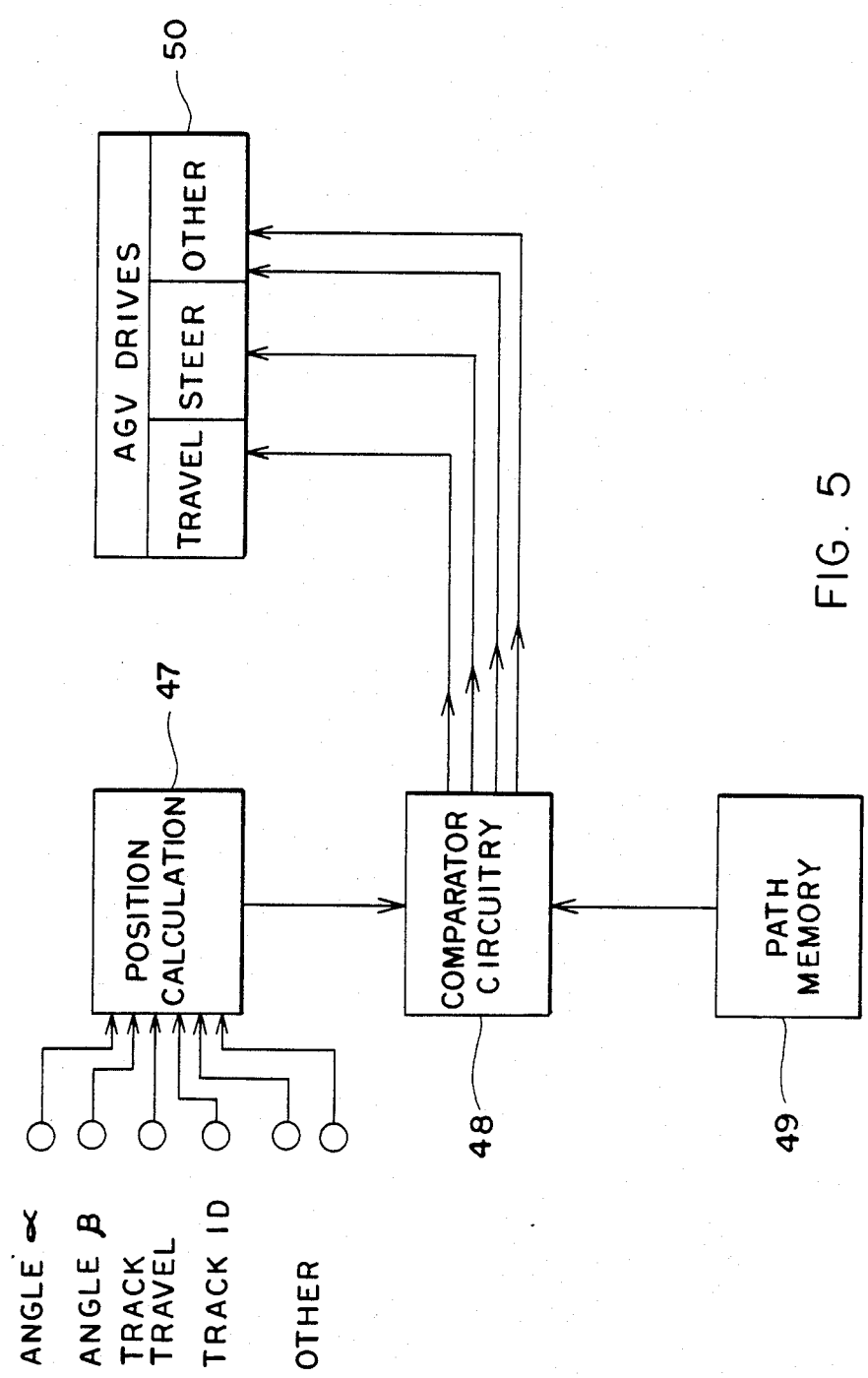
FIG. 5 is an electrical block diagram showing the control for the automated guided vehicle system.

The electronic controls for system 10, which can be carried on vehicle 11 and/or which can be provided at a central processing area, are shown in block form in FIG. 5. A signal from transducer 32 proportional to angle $\alpha$, a signal from transducer 45 proportional to angle β, and longitudinal track location signals from sensor 17 and encoder 19 are provided to a position calculation circuit 47. In a manner evident to one skilled in the art, circuit 47 utilizes that data to calculate the instantaneous actual position and orientation of vehicle 11.

Signals proportional to or indicative of that positional data are fed to comparator circuitry 48 which also receives reference signals from path memory 49. Path memory 49 stores the desired path for a vehicle 11 and thus signals proportional thereto are continually fed to comparator circuitry 48. If a particular reference signal from path memory 49 matches the position signal from circuit 47, an indication that vehicle 11 is exactly at the desired position at that moment in time, there is no output from comparator circuitry 48. However, if comparator circuitry 48 detects a difference in signals, indicative that vehicle 11 is not at the desired location, a signal is provided by circuitry 48 to a vehicle drive circuit 50.

Drive circuit 50 then acts to move the vehicle to the proper position. This action could take various forms. For example, if comparator circuitry 48 detected that the vehicle needed to be moved longitudinally along track 12, a travel signal would be initiated to drive the vehicle forward or backward. Similarly, if the lateral position of the vehicle or angular orientation of the vehicle needed to be adjusted, a steer signal would be initiated thereby turning the wheels of the vehicle until it reached the proper position.

It should be evident, as also shown in FIG. 5, that the system can be readily adapted to perform and control functions other than those just described here. For example, if the vehicle were to be equipped with a lifting and/or dumping mechanism to transfer material being handled, sensors could be provided to monitor the position of the same and provide these "other" signals to position calculation circuit 47 which would be programmed to mathematically determine the instantaneous position of that mechanism. Likewise, the desired instantaneous position of the mechanism would be stored in path memory 49 and if comparator circuitry 48 detected that a change in position was necessary, drive circuit 50 would be activated accordingly.

It should also be evident that by use of the system herein described, a considerable amount of movement and control can be programmed and stored in path memory 49. More importantly, any change in desired movement can be readily made by merely changing the necessary reference signals in path memory 49. Thus, the system described herein represents a substantial improvement in the art and otherwise accomplishes the objects of the invention.

We claim:

1. A system for determining the location of a vehicle comprising a track system, an arm of a fixed length connected at one end of the vehicle and at the other end to said track system and being movable longitudinally along said track system, means to determine the longitudinal position of said other end of said arm along said track system, means to determine the longitudinal and lateral position of the vehicle with respect to the other end of said arm, and means to determine the angular orientation of the vehicle with respect to the longitudinal direction of said track system, thereby longitudinally, laterally and angularly locating the vehicle.

2. A system according to claim 1 wherein said means to determine the longitudinal position of said other end of said arm includes position indicator means longitudinally spaced along said track system at predetermined locations, and means to sense and identify said position indicator means.

3. A system according to claim 2 wherein said means to determine the longitudinal position include sensor means to determine the precise location of said other end of said arm as it is positioned between adjacent of said position indicator means.

4. A system according to claim 1 wherein said arm is pivotally connected to said track system in a manner permitting pivotal movement in a direction lateral to said track system.

5. A system according to claim 4 wherein said means to determine the longitudinal and lateral position of the vehicle includes means to sense the pivotal movement of said arm to determine the angle between said arm and said track system.

6. A system according to claim 5 wherein said means to sense the pivotal movement provides an output electrical signal representative of the angle between said arm and said track system and wherein said means to determine the longitudinal and lateral position of the vehicle includes circuit means receiving said output electrical signal, determining the position of the vehicle therefrom, and providing output signals representative thereof.

7. A system according to claim 6 which also controls the position of the vehicle and further comprising means providing reference signals representative of the desired location of the vehicle, and comparison means receiving said reference signals and said output signals of said circuit means and providing command signals to control the position of the vehicle.

8. A system according to claim 1 wherein said arm is pivotally connected to the vehicle and said means to determine the angular orientation of the vehicle includes means to sense the pivotal movement of said arm to determine the angle between said arm and the longitudinal centerline of the vehicle.

9. A system of controlling the position of a vehicle comprising a track system; an arm of a fixed length pivotally connected at one end to the vehicle and at the other end to said track system and being movable longitudinally along said track system; first sensor means detecting the longitudinal position of said other end of said arm along said track system and providing an output signal representative thereof; second sensor means detecting the angular position of said arm with respect to said track system and providing an output signal representative thereof; third sensor means detecting the angular position of said arm with respect to the longitudinal centerline of the vehicle and providing an output signal representative thereof; circuit means receiving the signals of said first, second and third sensor means, determining the position of the vehicle therefrom, and providing output signals representative thereof; means providing reference signals representative of the desired location of the vehicle; and comparing means receiving said reference signals and said output signals from said circuit means and providing command signals to control the position of the vehicle.

10. A system according to claim 9 wherein said first sensor means includes position indicator means spaced along said track system, and means to sense and identify said position indicator means.

11. A system according to claim 10 wherein said first sensor means includes means determining the position of said other end of said arm between adjacent of said position indicator means.

12. A method of controlling the position of a vehicle connected to an overhead track by a mast arm of a fixed length comprising the steps of determining the longitudinal position of the point that the mast arm is connected to the track, determining the longitudinal and lateral position of a point on the vehicle relative to the determined position of the point that the mast arm is connected to the track, comparing the determined position of the point on the vehicle with the desired position of the point on the vehicle, and moving the vehicle if necessary to the desired position.

* * * * *